United States Patent [19]

Kubota et al.

[11] 3,920,321

[45] Nov. 18, 1975

[54] ELECTROMAGNETIC RELEASE DEVICE FOR A MOTOR DRIVEN MOTION PICTURE CAMERA

[75] Inventors: Isamu Kubota, Izumisano; Yoshihisa Hayashi, Sakai; Teruo Ichikawa, Gamagori, all of Japan

[73] Assignee: Minolta Camera Kabushiki Kaisha, Osaka, Japan

[22] Filed: Mar. 22, 1972

[21] Appl. No.: 237,134

[30] Foreign Application Priority Data

Mar. 26, 1971 Japan.............................. 46-18078

[52] U.S. Cl. ............................................ 352/177
[51] Int. Cl.² .......................................... G03B 1/00
[58] Field of Search.................... 352/174, 176, 177

[56] References Cited
UNITED STATES PATENTS

| | | | |
|---|---|---|---|
| 3,520,598 | 7/1970 | Murata et al. .................. | 352/177 X |
| 3,576,362 | 4/1971 | Mayr et al. ..................... | 352/177 X |
| 3,602,584 | 8/1971 | Anderl et al...................... | 352/174 |

*Primary Examiner*—Monroe H. Hayes
*Attorney, Agent, or Firm*—Watson, Cole, Grindle & Watson

[57] ABSTRACT

In a motor driven picture camera, a stopper is fixed to a rotatable main shaft which is connected to a driving motor so as to drive a shutter mechanism provided with shutter blades and a film feeding mechanism for carrying the film. An electromagnet is provided for releasing a retaining member biased so as to restrain the rotation of the main shaft in sliding into contact with said stopper and engaging with it from the restraint of the main shaft. An electromagnet release device is provided for moving the retaining member against its spring in order to release the restraint of the retaining member. Such device is formed by connecting the coil of the electromagnet and the motor in series to an electric power source with a switch connected in series thereto.

1 Claim, 2 Drawing Figures

ELECTROMAGNETIC RELEASE DEVICE FOR A MOTOR DRIVEN MOTION PICTURE CAMERA

BACKGROUND OF THE INVENTION

The present invention relates to a motor driven motion picture camera and, more particularly, to such a camera which is provided with an electromagnetic release device for controlling the starting and stopping of the camera mechanism to operate a shutter mechanism and a film feeding mechanism.

Just before the motor actuates the camera mechanism in such type camera, the electromagnetic release device releases the restraint of the camera mechanism and, after the camera mechanism driven by the motor is stopped, it is required that the electromagnetic relay device stop the action effected by the inertia of the camera driving mechanism at a predetermined position.

This is so because the stopping of the camera mechanism effected by the electromagnetic release mechanism is in general carried into effect by restraining the rotation of the main shaft of the camera mechanism through the retaining lever at the position where the shutter blades shut off the exposure of a film from scene light. Therefore, if the motor actuates the camera mechanism before the restraint carried into effect by the retaining lever is released, the force given to the retaining lever and the restraining portion of the camera mechanism is increased. The electromagnet must therefore release the engagement of them against said force and accordingly the attraction of said electromagnet must be large. This increases the electric current consumed by the electromagnet, in addition to requiring a large-sized electromagnet and, accordingly, such is not suitable for a small-sized motor dirven motion picture camera.

Accordingly, two switches are provided in the prior art devices, or a switch having a two-stage operation is provided, and the electromagnetic release circuit is closed by the release operation and then the motor circuit is closed. This only complicates the construction of the switch itself and, in addition, a photographing is not effected when the release operation is stopped by closing only one of the switches.

Whereas, in a control circuit having an electromagnetic coil, a motor, and a switch therefor which are connected to an electric power source in series with one another, a condenser is normally connected across the motor in order to provide only one switch for a single opening/closing operation. In this manner, when the switch is closed a current running through the electromagnetic coil charges the condenser. There is almost no current running through the motor until the condenser is charged up to a certain voltage so that, after the restraint is released by the electromagnetic release, the camera mechanism can be actuated by the motor. However, even after the switch is opened, a current charged to the condenser runs to rotate the motor so that the power source is consumed in vain. In addition, after the condenser is charged during release, it is necessary to decrease the resistance of the coil of the electromagnet in order to take enough of the active voltage of the motor since the coil of the electromagnet is connected in series to the motor. Accordingly, the winding number of the coil may be reduced and the inductance thereof will become small. As the result, a sufficiently large current must be run in order to release the restraint. And, in order to feed such a large current through the condenser, the capacity of the condenser must be large. According to one design example making use of such a circuit, 3000 microfarads were required for the capacity of the condenser. A condenser of such a large capacity is expensive and, in addition, the external dimensions become large, so that it is difficult to incorporate it into a motor driven motion picture camera.

OBJECTS OF THE INVENTION

An object of the present invention is to provide an electromagnetic release device for a motor driven motion picture camera in which the aforementioned drawbacks are avoided by making use of a single opening/closing switch, in lieu of adding a special circuit element such as a condenser or the like to a control circuit. After the electromotive release device releases the restraint of the camera mechanism when the switch is closed, a motor is provided to actuate the camera mechanism.

Another object of the present invention is to provide such an electromagnetic release device wherein the electric current of power source thereby consumed is small at the time the camera mechanism is driven and when it is stopped.

A further object of the present invention is to provide such an electromagnetic release device which is composed of few parts, is of small size, is light-weighted, and is yet reliable during prolonged period of use.

Other objects of the invention will become apparent from the following description of the invention when considered in conjunction with the accompanying drawings.

SUMMARY OF THE INVENTION

In a motor driven motion picture camera, a stopper is fixed to a main shaft for driving the camera mechanism composed of a shutter mechanism driven by a motor and porvided with shutter blades and a film carrying mechanism. A retaining member biased by a spring is also provided so as to restrain the stopper against sliding into contact and engaging with it, and an electromagent is provided for moving the retaining member against its spring in order to release the restraint of the retaining member. The present invention relates to an electromagnetic release device formed by connecting the coil of the electromagnet and the motor in series to an electric power source with a switch connected in series thereto.

In order to effect the release operation of the electromagnetic coil relative to a variation of the current increased as time elapses running through the control circuit by virtue of the starting torgue, inductance of the electromagnetic coil, and inductance of the motor, by increasing the lowest starting current required for the motor to actuate the camera mechanism against its inertia more than the required current running through the electromagnetic coil, the electromagnet initially effects the release operation of the camera mechanism and then the camera mechanism is actuated.

DESCRIPTION OF THE PREFERRED EMBODIMENT

Figure 1:
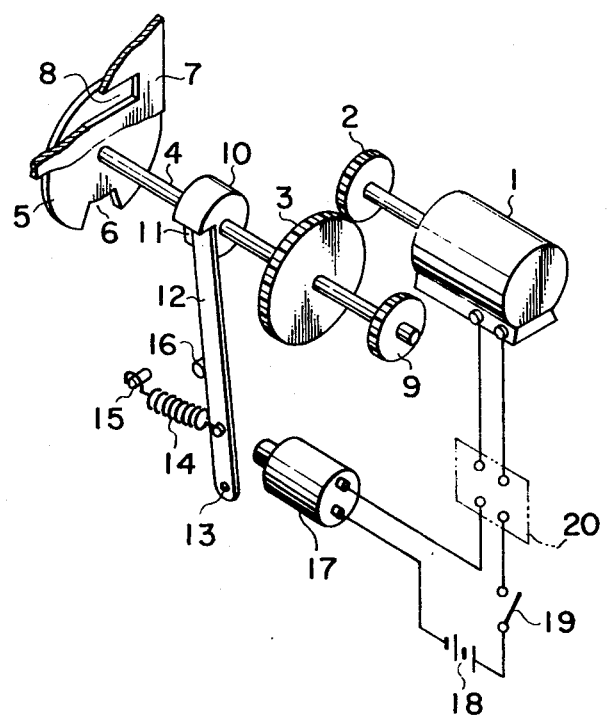
FIG. 1 is a perspective view of the essential parts of the camera mechanism in accordance with the present invention, and a view showing the control circuit thereof.

In FIG. 1, driving motor 1 is operatively connected, by means of gears 2 and 3, to main shaft 4 which is rotatably supported by a pin on the camera body. Main shaft 4 has a shutter blade 5 fixed to one end thereof, a gear 9 fixed to the other end thereof, and a collar 10 fixed to the central portion thereof. It should be noted that gear 9 is connected to a carrying mechanism, although such mechanism is not shown.

Shutter blade 5 has a notched opening 6 therein corresponding to an aperture 8 so as to permit an exposure of a film therein (not shown in FIG. 1) transmitting through an objective lens 7.

Also collor 10 has a hook 11 for engaging with a retaining lever 12, to be more fully described hereinafter, for stopping main shaft 4 just at the position where shutter blade 5 shields aperture 8.

Retaining lever 12, which is pivotally supported by a pin 13 on the camera body, is composed of a ferromagnetic substance and is biased in a counterclockwise turning direction by means of a spring 14 located between lever 12 and a pin 15 mounted on the camera body. The lever 12 is so biased as to slide into contact with the end face of collar 10. Therefore, when it engages with hook 11 thereof, the turning of retaining lever 12 is checked by a stopper 16 mounted on the camera body, as shown in FIG. 1. Also, it should be noted that lever 12 may be of a paramagnetic material and have an armature corresponding to an electromagnet provided thereon.

An electromagnet 17 is mounted on the camera body in a direction facing toward lever 12 so that when electromagnet 17 is excited, retaining lever 12 is attracted thereto and pivots in a clockwise direction against spring 14. The free end of lever 12 thereby disengages from hook 11 to permit rotation of main shaft 4 to continue.

The control circuit is connected in series with motor 1 and with the coil of electromagnet 17 across power source 18 and switch 19 which is closed by the release operation. Reference numeral 20 denotes in phantom lines a circuit added to control the rotating speed of motor 1.

Figure 2:
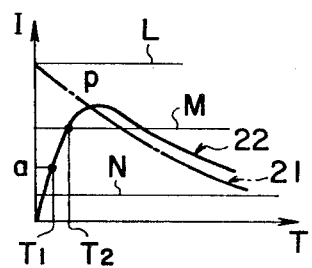
FIG. 2 is a diagram showing the time and the current intensity from the instant the switch is closed until the camera mechanism is normally driven.

If the camera mechanism, as shown in FIG. 1 is stopped, as when switch 19 is closed by the release operation provided there is no impedance in the control circuit, the maximum current equivalent to current L at the time motor 1 is stopped runs when switch 19 is closed because of the starting torque of the camera mechanism as shown by chain line 21 in FIG. 2. Therefore, the maximum current changes gradually to current N for normally rotating the main shaft. And, in the meanwhile, the lowest starting current M is to be in existence as shown in FIG. 2, as a matter of course between maximum current and current N.

Whereas, full line 22 denotes the current which runs substantially through the control circuit, in which the inductance of the coil of electromagnet 17 and the inductance of motor 1 are taken into consideration. It also denotes the current which was zero when switch 19 was closed is suddenly increased and when period $T_1$ elapses. By virtue of current $a$ running through the coil of electromagnet 17, electromagnet 17 attracts retaining lever 12 against spring 14 and the frictional force effected by the engagement of the free end of retaining lever 12 and hook 11, and releases the turning of main shaft 4. Then, when period $T_2$ elapses, the current gets to M and further gets to the lowest starting current for actuating the camera mechanism against the inertia and the static friction of said camera mechanism stopped. Motor 1 then starts to rotate main shaft 4 in the release state.

Therefore, by opening switch 19, the control circuit automatically releases the restraint of main shaft 4 for operating the camera driving member and then permits the camera driving member to actuate.

In this operation, in order to keep the relation of $T_1 < T_2$ wherein $T_1$ and $T_2$ are respectively a period, the impedance of the coil of the electromagnet is required only to be increased, but $T_2 - T_1$ is not required to be enlarged, and it is preferable that $T_2$ and $T_1$ are at a clost time point. And, even though $T_1$ may be slightly larger than $T_2$, if it is at a close period end, the period at the time when the driving force of motor 1 acts actually upon the engaging portion of retaining lever 12 and hook 11 by virtue of the inertia and the camera mechanism and the clearance of the camera mechanism is behind period $T_2$ and $T_1$, the actual release action is not impeded. Such a condition is also contemplated by the present invention.

What we claim is:

1. A motor driven motion picture camera comprising:
   a driving motor;
   a rotatable main shaft driven by said driving motor for driving a camera mechanism including a film driving means for transmitting said film successively to an aperture, and a shutter blade for exposing said film facing toward said aperture successively;
   a stopper fixedly mounted on said main shaft;
   a retaining member having an armature biased to engage with said stopper for restraining said main shaft in a position as to shield said aperture from a scene light with said shutter blade;
   an electromagnet for attracting said armature to disengage said retaining member from said stopper, thereby releasing said restrainment of said main shaft;
   a normally opened switch means closed in response to a camera release operation;
   a power source connected in series in a loop solely with said electromagnet, said driving motor and said switch means respectively; and
   said electromagnet being arranged so that the current running through the coil of said electromagnet required for attracting said retaining member to release said main shaft as compared to the current running through said loop is smaller than the lowest starting current required for said motor to actuate said camera mechanism, whereby the release and actuation of the camera mechanism is controlled solely by said electromagnet and said motor.

* * * * *